United States Patent
Arai et al.

(10) Patent No.: US 10,171,689 B2
(45) Date of Patent: Jan. 1, 2019

(54) IMAGE FORMING SYSTEM AND METHOD FOR IDENTIFYING ACCESSORY DEVICE AND IMAGE FORMING APPARATUS

(71) Applicant: CANON KABUSHIKI KAISHA, Tokyo (JP)

(72) Inventors: Akihiro Arai, Toride (JP); Mitsuhiko Sato, Kashiwa (JP); Toshiyuki Miyake, Abiko (JP); Takashi Yokoya, Kashiwa (JP); Hiromasa Maenishi, Matsudo (JP); Yutaka Ando, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/707,512

(22) Filed: May 8, 2015

(65) Prior Publication Data

US 2015/0331642 A1 Nov. 19, 2015

(30) Foreign Application Priority Data

May 13, 2014 (JP) .................................. 2014-099599

(51) Int. Cl.
*G06F 3/12* (2006.01)
*H04N 1/00* (2006.01)
*G03G 15/00* (2006.01)

(52) U.S. Cl.
CPC ....... *H04N 1/0032* (2013.01); *G03G 15/5075* (2013.01); *G06F 3/1204* (2013.01);
(Continued)

(58) Field of Classification Search
CPC ...... G06F 3/121; G06F 3/1261; G06F 3/1291; G06F 3/1234
(Continued)

(56) References Cited

U.S. PATENT DOCUMENTS 8,368,936 B2 * 2/2013 Teramoto ............ H04L 12/1822
345/173
8,422,072 B2 * 4/2013 Okamoto ........... G03G 15/5087
358/1.15
(Continued)

FOREIGN PATENT DOCUMENTS

JP 2003-112464 A 4/2003
JP 2005-321482 A 11/2005
(Continued)

OTHER PUBLICATIONS

U.S. Appl. No. 14/709,934, filed May 12, 2015.
Japanese Office Action issued in corresponding Japanese Application No. 2014-099599 dated Jan. 30, 2018.

*Primary Examiner* — Neil R McLean
*Assistant Examiner* — Darryl V Dottin
(74) *Attorney, Agent, or Firm* — Venable LLP

(57) ABSTRACT

The image forming system comprises an accessory device and an image forming apparatus, the accessory device for storing device identification information for identifying its own device, and the image forming apparatus to which the accessory device is connected. The image forming apparatus stores the device identification information of the accessory device included in the image forming system. Further, the image forming apparatus receives a participation notification which requires participating in the image forming system from a new accessory device including the device identification information. If the device identification information included in the received participation notification is not stored, the image forming apparatus stores the information. If already stored, the image forming apparatus discards the participation notification.

3 Claims, 20 Drawing Sheets

(52) U.S. Cl.
CPC .......... *G06F 3/1231* (2013.01); *G06F 3/1236* (2013.01); *G06F 3/1294* (2013.01); *G06F 3/1297* (2013.01)

(58) Field of Classification Search
USPC ........................................................ 358/1.15
See application file for complete search history.

(56) References Cited

U.S. PATENT DOCUMENTS

| | | |
|---|---|---|
| 2007/0086045 A1 | 4/2007 | Nishikata et al. ............ 358/1.15 |
| 2007/0162741 A1* | 7/2007 | Kasaura .............. H04L 63/0823 |
| | | 713/156 |
| 2012/0092726 A1* | 4/2012 | Nishikata ........... G03G 15/5075 |
| | | 358/1.15 |
| 2012/0221702 A1* | 8/2012 | Umehara ............ H04L 12/1818 |
| | | 709/223 |
| 2013/0031174 A1* | 1/2013 | Baba ..................... G06F 9/5033 |
| | | 709/204 |

FOREIGN PATENT DOCUMENTS

| | | |
|---|---|---|
| JP | 2007-062166 A | 3/2007 |
| JP | 2007-076006 A1 | 3/2007 |
| JP | 2008-252197 A | 10/2008 |

\* cited by examiner

| DEVICE NAME | NODE ID |
|---|---|
| IMAGE FORMING APPARATUS | 1 |
| SHEET FEEDING DEVICE | 2 |
| STACKER | 5 |
| CASE WORK DEVICE | 7 |
| FINISHER | 8 |

CONFIRMATION OF DEVISE

THE MARKED DEVICE IS NOT RECOGNIZABLE. PLEASE CONFIRM CONNECTION OF POWER CABLE AND COMMUNICATION CABLE AND PRESS [RE-RECOGNITION] KEY.
(IF STARTING IN THIS STATE, PRESS [FORCIBLY-STARTING] KEY.)

SHEET FEEDING DEVICE 1

△ SHEET FEEDING DEVICE 2

STACKER 1

△ STACKER 2

CASE WORK DEVICE

FINISHER

| FORCIBLY STARTING | RE-RECOGNITION |

FIG. 7

| UPSTREAM SIDE DEVICE LIST | | |
|---|---|---|
| ARRANGEMENT ORDER | ARRANGEMENT ORDER | NODE ID |
| 1 | FIRST SHEET FEEDING DEVICE | 2 |
| 2 | SECOND SHEET FEEDING DEVICE | 3 |

| DOWNSTREAM SIDE DEVICE LIST | | |
|---|---|---|
| ARRANGEMENT ORDER | ARRANGEMENT ORDER | NODE ID |
| 1 | FIRST STACKER | 5 |
| 2 | SECOND STACKER | 6 |
| 3 | CASE WORK DEVICE | 7 |
| 4 | FINISHER | 8 |

FIG. 20

IMAGE FORMING SYSTEM AND METHOD FOR IDENTIFYING ACCESSORY DEVICE AND IMAGE FORMING APPARATUS

BACKGROUND OF THE INVENTION

Field of the Invention

The present disclosure relates to an image forming system which comprises an image forming apparatus such as an electrophotographic printer and various accessory devices connected to the image forming apparatus.

Description of the Related Art

An image forming system is configured by an image forming apparatus and an accessory device. In the system, the accessory device, such as a sheet feeding device, a stacker, a book binding device, a finisher and the like, are connected to the image forming apparatus. The image forming apparatus and the accessory device of the image forming system are connected through a bus topology network to establish data communication therebetween. By freely configuring each device, high-speed communication can be established through the bus topology network.

Each device forming the image forming system has type identification information, which is unique to a type of device and is called node ID. It is generally known that, in bus topology, device is identified by the node ID to establish communication between devices. Here, if the node ID overlaps, accurate communication cannot be secured, which causes malfunction. Further, each device connected to the bus topology network is capable of recognizing the type of device connected by the node ID. However, it is difficult to physically recognize an order in which each device is connected unless performing some methods for identifying the connected device each time the device is connected, etc.

In case of the image forming system, it is general that the node ID is managed by the image forming apparatus. The image forming apparatus holds a connection order of the accessory devices in the built-in memory. Then, the image forming apparatus compares the detection result obtained by the detection of the connection state by performing the method for identifying etc., with the connection order held in the memory. Through this, the image forming apparatus confirms the connection state. If the connection order held in the memory does not match the detection result, the image forming apparatus notifies a user that an abnormality has occurred in the connection of the accessory devices and prompts the user to take some appropriate actions to solve the situation.

For example, in Japanese Patent Application Laid-open No. 2007-062166, when the connection order held does not match the detection result, an image forming apparatus displays a message to prompt a user to take some appropriate actions. In the message, the user is prompted to disconnect the accessory device found to be inconsistent with the detection result; to turn on power source again; or to reset the connection order of the accessory device. In US2007/0086045 (A1), when the connection order held does not match the detection result, the image forming apparatus displays a message. In the message, the user is prompted to input an instruction to disconnect the accessory device to make the apparatus available. In Japanese Patent Application Laid-open No. 2007-076006, when the accessory device is inoperable, it is prompted to reset the connection order of the accessory devices when setting the connection order of the accessory devices is set.

As mentioned, conventionally, the setting of the devices, including determination of the connection order of the devices or prevention of the overlap of the node ID, is performed by a user or a service person of the image forming system. Since it is the users that work when introducing or changing the configuration of the image forming system, wasteful works or operational failures due to wrong setting may be caused.

SUMMARY OF THE INVENTION

An image forming system according to an aspect of the present disclosure includes: an accessory device configured to store device identification information for identifying the accessory device; and an image forming apparatus to which the accessory device is connected. In the image forming system, the image forming apparatus further comprising: a storing unit configured to store the device identification information of the accessory device which has already participated in the image forming system; and a control unit configured to store, when receiving a participation notification including the device identification information requiring to participate in the image forming system from a new accessory device, the device identification information included in the received participation notification in the storing unit if the device identification information included in the received participation notification is not stored in the storing unit, and to discard the participation notification if the device identification information included in the participation notification as receive is already stored in the storing unit.

Further features of the present invention will become apparent from the following description of exemplary embodiments (with reference to the attached drawings).

BRIEF DESCRIPTION OF THE DRAWINGS

FIG. 7 is a diagram illustrating image displayed on a liquid crystal display section.

FIG. 20 is a diagram illustrating upstream side device list and downstream side device list.

DESCRIPTION OF THE EMBODIMENTS

In the following, embodiments are described in detail with reference to the accompanying drawings.

(Configuration of Image Forming System)

Figure 1:
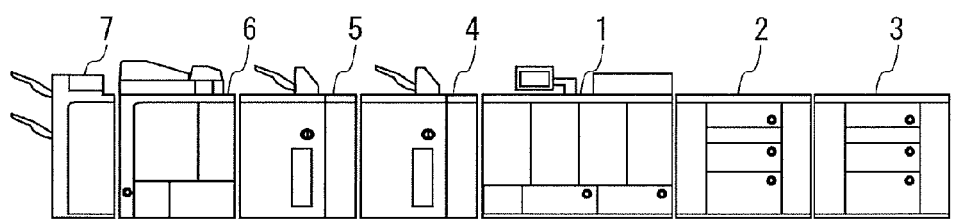
FIG. 1 is a front appearance diagram of image forming system.

FIG. 1 is a front appearance diagram of an image forming system of the present embodiment. The image forming system comprises an image forming apparatus 1, a first sheet feeding device 2, a second sheet feeding device 3, a first stacker 4, a second stacker 5, a case work device 6, and a finisher 7. Note that the first sheet feeding device 2, the second sheet feeding device 3, the first stacker 4, the second stacker 5, the case work device 6, and the finisher 7 are examples of accessory device so that the image forming system may comprise other devices. According to the user's purpose of use, one or more accessory devices are freely configured in the image forming system. The image forming apparatus 1 performs entire control of the image forming system.

A sheet is conveyed from the second sheet feeding device 3 to the first sheet feeding device 2, the image forming apparatus 1, the first stacker 4, the second stacker 5, the case work device 6, and the finisher 7 in order. In the following, based on the sheet conveyance order, a conveyance source is defined as upstream and a conveyance destination is defined as downstream.

The first sheet feeding device 2 and the second sheet feeding device 3 are connected to the upstream side of the image forming apparatus 1, which performs image forming processing, in series. Both the first sheet feeding device 2 and the second sheet feeding device 3 supply sheets used for image formation to the image forming apparatus 1. Further, the first stacker 4, the second stacker 5, the case work device 6, and the finisher 7 are connected to the downstream side of the image forming apparatus 1 in series. The first stacker 4 and the second stacker 5 stack sheets having images formed thereon by the image forming apparatus 1. The case work device 6 performs gluing bookbinding of the sheets having images formed thereon. The finisher 7 performs post-processing of the sheets having images formed thereon such as staple processing, sort processing, and the like.

Figure 2:
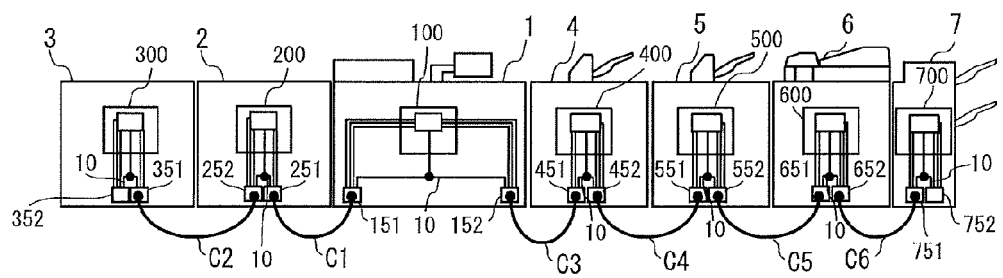
FIG. 2 is a back appearance diagram of image forming system.

FIG. 2 is a back appearance diagram of the image forming system in FIG. 1. Each device is connected to the adjacent devices by cable so that data can be transmitted and received. Therefore, the image forming apparatus 1 has connectors 151 and 152. The first sheet feeding device 2 has connectors 251 and 252. The second sheet feeding device 3 has connectors 351 and 352. The first stacker 4 has connectors 451 and 452. The second stacker 5 has connectors 551 and 552. The case work device 6 has connectors 651 and 652. The finisher 7 has connectors 751 and 752.

The connector 151 of the image forming apparatus 1 is connected to the connector 251 of the first sheet feeding device 2 by a cable C1. The connector 252 of the first sheet feeding device 2 is connected to the connector 351 of the second sheet feeding device 3 by a cable C2. The connector 152 of the image forming apparatus 1 is connected to the connector 451 of the first stacker 4 by a cable C3. The connector 452 of the first stacker 4 is connected to the connector 551 of the second stacker 5 by a cable C4. The connector 552 of the second stacker 5 is connected to the connector 651 of the case work device 6 by a cable C5. The connector 652 of the case work device 6 is connected to the connector 751 of the finisher 7 by a cable C6. The connector 352 of the second sheet feeding device 3 and the connector 752 of the finisher 7 to which no cable is connected are respectively connected to terminal resistor, which is provided in the apparatus, through network bus 10. Note that the terminal resistor is included in all devices. The connector, to which no cable is connected, is connected to the terminal resistor.

The image forming apparatus 1 includes a control unit 100. The control unit 100 is connected to the connectors 151 and 152. The first sheet feeding device 2 includes a control unit 200. The control unit 200 is connected to the connectors 251 and 252. The second sheet feeding device 3 includes a control unit 300. The control unit 300 is connected to the connectors 351 and 352. The first stacker 4 includes a control unit 400. The control unit 400 is connected to the connectors 451 and 452. The second stacker 5 includes a control unit 500. The control unit 500 is connected to the connectors 551 and 552. The case work device 6 includes a control unit 600. The control unit 600 is connected to the connectors 651 and 652. The finisher 7 includes a control unit 700. The control unit 700 is connected to the connectors 751 and 752.

(Control System)

Figure 3:
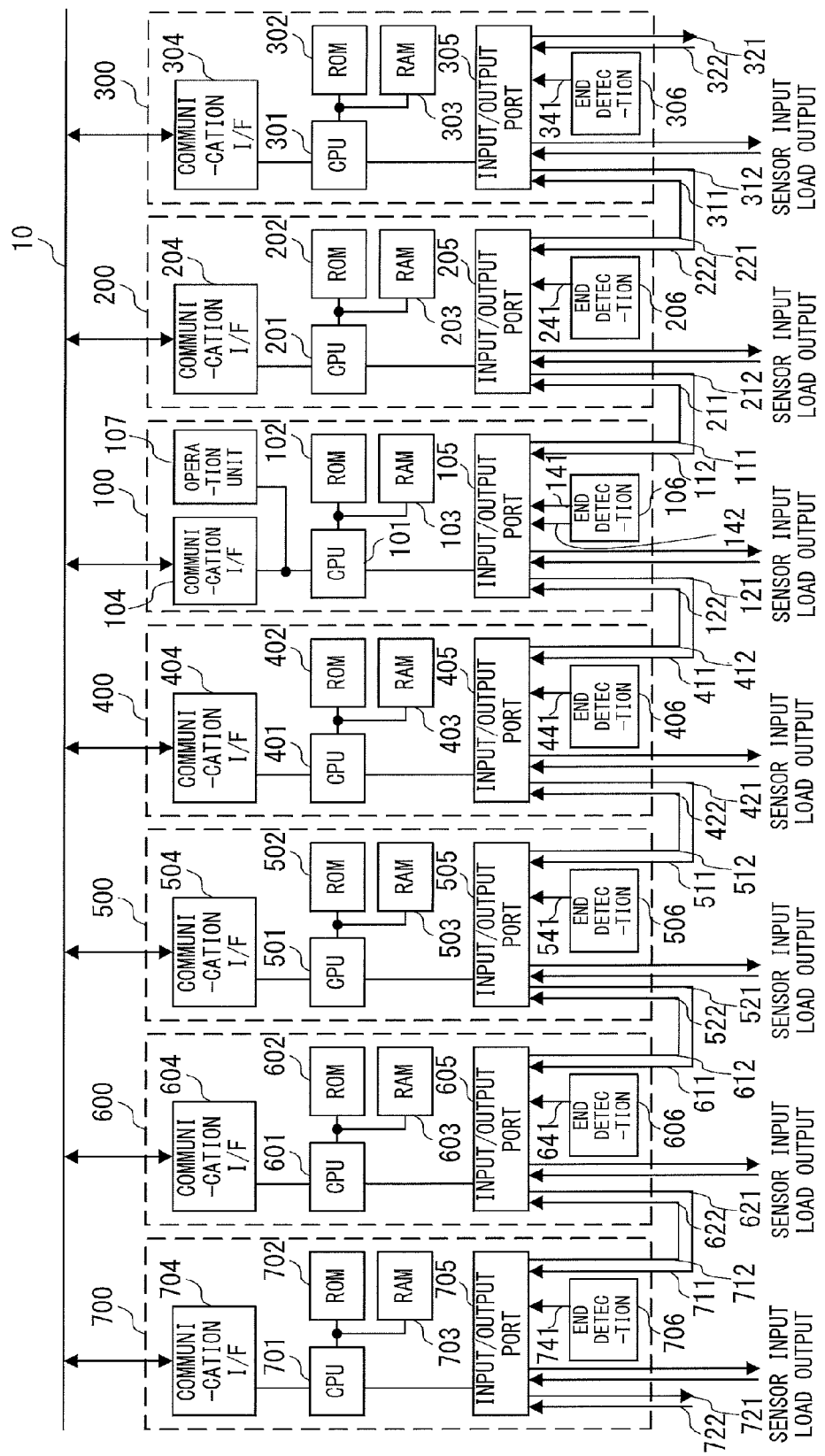
FIG. 3 is a configuration diagram a control system.

FIG. 3 is a configuration diagram of a control system formed by control units 100 to 700 included in each device. As shown in FIG. 2, each control unit 100 to 700 is connected to other adjacent control units by the cables C1 to C6. Each cable C1 to C6 includes bus line of the network bus 10. Thus, each control unit 100 to 700 is connected to the network bus 10. Each control unit 100 to 700 is capable of performing broadcast transmission of data to the rest of the control units connected to the network bus 10. Further, each control unit 100 to 700 is a multi-master which is capable of starting data transmission by themselves. As a communication system through the network bus 10, Ethernet™, Controller Area Network (CAN), ARCNET (Attached Resource Computer NETwork) and the like, which are multi-master and capable of broadcast transmission, can be used.

The control unit 100 of the image forming apparatus 1 comprises a central processing unit (CPU) 101, a read only memory (ROM) 102, and a random access memory (RAM) 103. The control unit 100 further comprises a communication interface (I/F) 104, an input/output port 105, and an operation unit 107.

The CPU 101 controls an operation of the image forming apparatus 1 by reading computer program stored in the ROM 102 and executing the computer program using the RAM 103 as a work area. Further, the CPU 101 is connected to the network bus 10 via the communication I/F 104. By transmitting and receiving control data to/from the rest of the control units 200 to 700, the CPU 101 can control the operation of the accessory device faster than daisy chain connection and the like.

The input/output port 105 is connected to the CPU 101 by address bus and data bus. The input/output port 105 includes input ports 112 and 122, output ports 111 and 121, and end detection ports 141 and 142. The input port 112 and the output port 111 are connected to the control unit 200 of the first sheet feeding device 2. The input port 122 and the output port 121 are connected to the control unit 400 of the first stacker 4. The end detection ports 141 and 142 are the input ports connected to an end detection unit 106. Further, signals from sensors (not shown) are input to the input/output port 105. Control signals to loads (not shown) of motor, clutch and the like are output from the input/output port 105. By obtaining signals from the sensors and outputting the control signals to the loads via the input/output port 105, the CPU 101 controls sheet conveyance processing and image forming processing by the image forming apparatus 1.

Figures 4, 5:
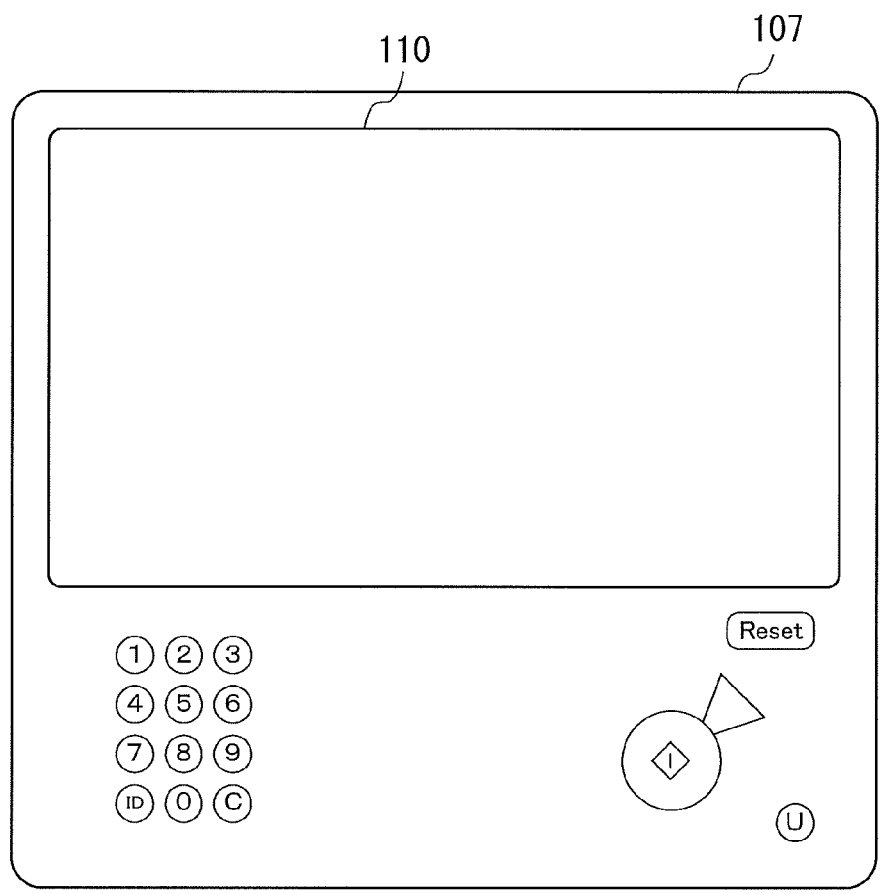
FIG. 4 is a diagram illustrating an appearance of a control unit.
FIG. 5 is a diagram explaining type of device and node ID.

The operation unit 107 is an input device operated by a user. Through the operation unit 107, various settings and instructions are input to the CPU 101. Further, the operation unit 107 comprises a display device, where visually provides information to the user by the control of the CPU 101. FIG. 4 is a diagram illustrating the appearance of the control unit 107. The operation unit 107 comprises a liquid crystal display section 110 which comprises a touch panel. By touching a display screen of the liquid crystal display section 110, the user can perform setting operation relating to the image formation. Further, the user can confirm the state of the image forming system by the contents displayed on the liquid crystal display section 110. In addition, the operation unit 107 comprises physical key buttons. By the user's key operation, instruction according to the key button is input to the CPU 101.

The control unit 200 of the first sheet feeding device 2 comprises a CPU 201, a ROM 202, a RAM 203, a communication I/F 204, and an input/output port 205.

The CPU 201 controls an operation of the first sheet feeding device 2 by reading computer program stored in the ROM 202 and executing the computer program using the RAM 203 as a work area. Further, the CPU 201 is connected to the network bus 10 via the communication I/F 204. By transmitting and receiving control data to/from the control units 100 and 300, which are adjacent to the control unit 200 via the network bus 10, the CPU 201 controls sheet delivery operation and the like. The CPU 201 is capable of performing broadcast transmission of data through the network bus 10 via the communication I/F 204 and receiving data which is broadcast transmitted from the rest of the control units 100, and 300 to 700.

The input/output port 205 is connected to the CPU 201 by address bus and data bus. The input/output port 205 includes input ports 211 and 222, output ports 212 and 221, and end detection port 241. The input port 211 and the output port 212 are connected to the control unit 100 of the image forming apparatus 1. The input port 222 and the output port 221 are connected to the control unit 300 of the second sheet feeding device 3. Further, signals from sensors (not shown) are input to the input/output port 205. Control signals to loads (not shown) of motor, clutch and the like are output from the input/output port 205. By obtaining signals from the sensors and outputting the control signals to the loads via the input/output port 205, the CPU 201 controls sheet conveyance and sheet feeding by the first sheet feeding device 2.

The configuration of the control units 300, 400, 500, 600, and 700 of the second sheet feeding device 3, the first stacker 4, the second stacker 5, the case work device 6, and the finisher 7 respectively is similar to that of the control unit 200 of the first sheet feeding device 2.

By transmitting and receiving control data to/from the control unit 200, which is adjacent to the control unit 300, via the network bus 10, the CPU 301 of the control unit 300 controls the sheet delivery operation and the like. The CPU 301 is capable of performing broadcast transmission of data through the network bus 10 via the communication I/F 304 and receiving data which is broadcast transmitted from the rest of the control units 100, 200, and 400 to 700. By obtaining signals from the sensors and outputting the control signals to the loads via the input/output port 305, the CPU 301 controls sheet conveyance and sheet feeding by the second sheet feeding device 3. The input port 311 and the output port 312 of the control unit 300 are connected to the control unit 200 of the first sheet feeding device 2. The input port 322 and the output port 321 are terminated.

By transmitting and receiving control data to/from the control units 100 and 500, each of which is adjacent to the control unit 400, via the network bus 10, the CPU 401 of the control unit 400 controls the sheet delivery operation and the like. The CPU 401 is capable of performing broadcast transmission of data via the communication I/F 404 and receiving data which is broadcast transmitted from the rest of the control units 100 to 300, and 500 to 700. By obtaining signals from the sensors and outputting the control signals to the loads via the input/output port 405, the CPU 401 controls sheet conveyance and post-processing by the first stacker 4. The input port 411 and the output port 412 of the control unit 400 are connected to the control unit 100 of the image forming apparatus 1. The input port 422 and the output port 421 are connected to the control unit 500 of the second stacker 5.

By transmitting and receiving control data to/from the control units 400 and 600, each of which is adjacent to the control unit 500, via the network bus 10, the CPU 501 of the control unit 500 controls the sheet delivery operation and the like. The CPU 501 is capable of performing broadcast transmission of data through the network bus 10 via the communication I/F 504 and receiving data which is broadcast transmitted from the rest of the control units 100 to 400, 600 and 700. By obtaining signals from the sensors and outputting the control signals to the loads via the input/output port 505, the CPU 501 controls sheet conveyance and post-processing by the second stacker 5. The input port 511 and the output port 512 of the control unit 500 are connected to the control unit 400 of the first stacker 4. The input port 522 and the output port 521 are connected to the control unit 600 of the case work device 6.

By transmitting and receiving control data to/from the control units 500 and 700, each of which is adjacent to the control unit 600, via the network bus 10, the CPU 601 of the control unit 600 controls the sheet delivery operation and the like. The CPU 601 is capable of performing broadcast transmission of data through the network bus 10 via the communication I/F 604 and receiving data which is broadcast transmitted from the rest of the control units 100 to 500 and 700. By obtaining signals from the sensors and outputting the control signals to the loads via the input/output port 605, the CPU 601 controls sheet conveyance and post-processing by the case work device 6. The input port 611 and the output port 612 are connected to the control unit 500 of the second stacker 5. The input port 622 and the output port 621 are connected to the control unit 700 of the finisher 7.

By transmitting and receiving control data to/from the control unit 600, which is adjacent to the control unit 600, via the network bus 10, the CPU 701 of the control unit 700 controls the sheet delivery operation and the like. The CPU 701 is capable of performing broadcast transmission of data via the communication I/F 704 and receiving data which is broadcast transmitted from the rest of the control units 100 to 600. By obtaining signals from the sensors and outputting the control signals to the loads via the input/output port 705, the CPU 701 controls sheet conveyance and post-processing by the finisher 7. The input port 711 and the output port 712 of the control unit 700 are connected to the control unit 600 of the case work device 6. The input port 722 and the output port 721 are terminated.

Since the control system is constituted as above, in addition to the bus line of the network bus 10, the cables C1 to C6 include wiring to connect each input/output port 105 to 705 of the control units 100 to 700.

The CPU 101 of the control unit 100 and the CPU 201 of the control unit 200 are capable of receiving ON/OFF notification via the input/output ports 105 and 205. The CPU 201 of the control unit 200 and the CPU 301 of the control unit 300 are capable of receiving ON/OFF notification via the input/output ports 205 and 305. The CPU 101 of the control unit 100 and the CPU 401 of the control unit 400 are capable of receiving ON/OFF notification via the input/output ports 105 and 405. The CPU 401 of the control unit 400 and the CPU 501 of the control unit 500 are capable of receiving ON/OFF notification via the input/output ports 405 and 505. The CPU 501 of the control unit 500 and the CPU 601 of the control unit 600 are capable of receiving ON/OFF notification via the input/output ports 505 and 605. The CPU 601 of the control unit 600 and the CPU 701 of the control unit 700 are capable of receiving ON/OFF notification via the input/output ports 605 and 705.

The input port 322 and the output port 321 of the control unit 300 and the input port 722 and the output port 721 of the control unit 700 are terminated. Thus, an end detection port 341, connected to an end detection unit 306 of the input/output port 305 of the control unit 300, is turned on. Also, an end detection port 741, connected to an end detection unit 706 of the input/output port 705 of the control unit 700, is turned on. The end detection ports 141, 241, 441 to 641, connected to end detection units 106, 206, 406 to 606 of the rest of the control units 100, 200, 400 to 600 are turned off.

(Node ID)

The image forming apparatus 1, the first sheet feeding device 2, the second sheet feeding device 3, the first stacker 4, the second stacker 5, the case work device 6, and the finisher 7 respectively have node ID, which is the type identification information unique to a type of device. Each device holds the node ID in the ROMs 102 to 702 of the control units 100 to 700. The node ID is the device identification information for identifying communication counterpart when establishing communication between devices. FIG. 5 is a diagram explaining the type of device and node ID, in which the node ID (basic node ID) held in the ROMs 102 to 702 is illustrated.

According to FIG. 5, the basic node ID of the image forming apparatus is "1". The basic node ID of the first sheet feeding device 2 and the second sheet feeding device 3 is "2". The basic node ID of the first stacker 4 and the second stacker 5 is "5". The basic node ID of the case work device 6 is "7". The basic node ID of the finisher 7 is "8". When the node ID, included in the data as received which indicates destination, matches the node ID of its own device, each device assumes that the destination of the received data is its own device, and performs the processing.

As to the first sheet feeding device 2 and the second sheet feeding device 3, and the first stacker 4 and the second stacker 5, the node ID overlaps. This is resolved by performing the network configuration processing as described below.

(First Network Configuration Processing)

Each device forming the image forming system performs the network configuration processing when powered on.

(Processing of the Image Forming Apparatus)

Figure 6:
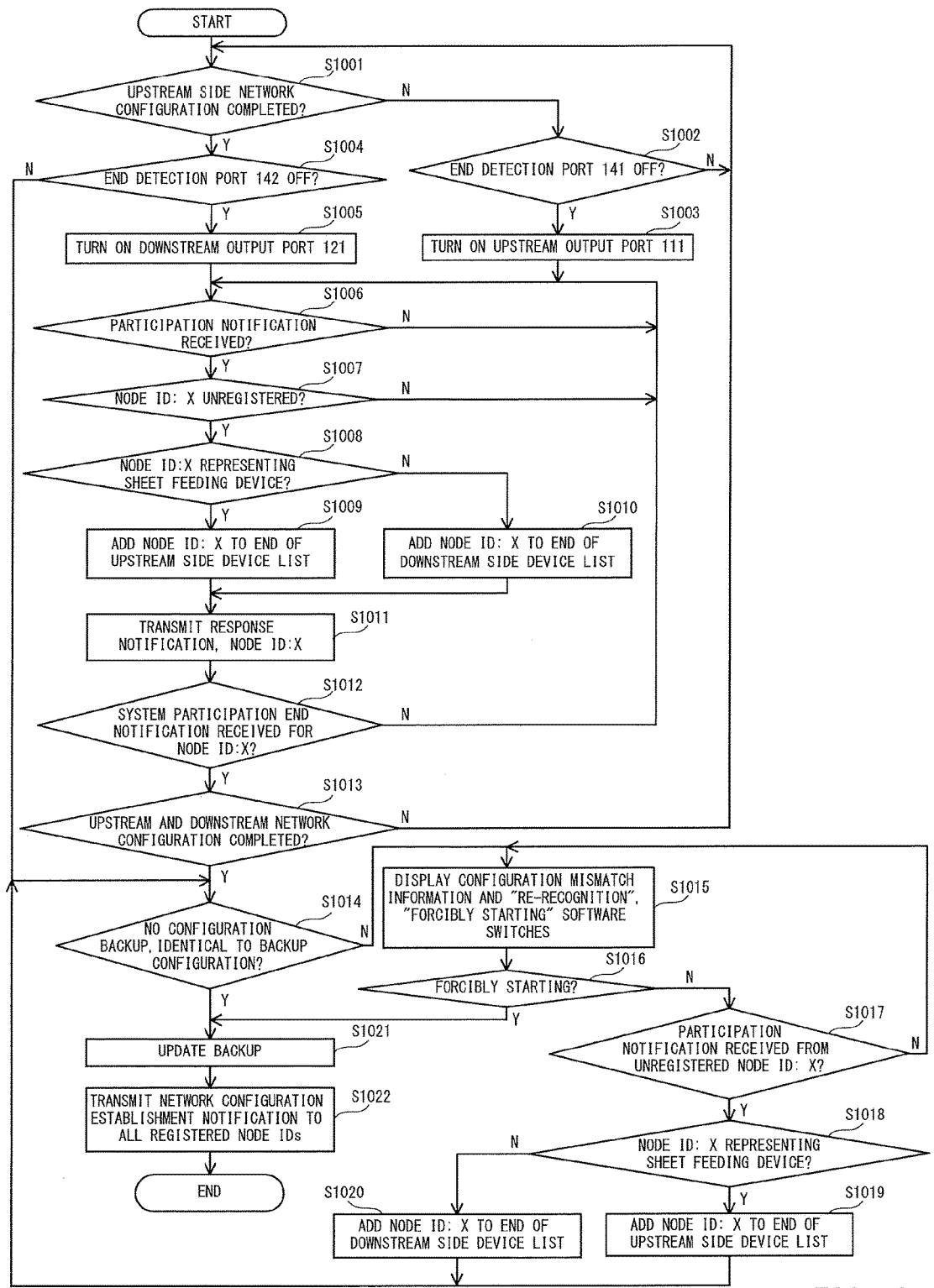
FIG. 6 is a flowchart illustrating network configuration processing by an image forming apparatus.

FIG. 6 is a flowchart illustrating the network configuration processing by the image forming apparatus 1. The image forming apparatus 1 first performs configuration processing for the apparatuses connected upstream of the image forming apparatus, i.e., upstream side network configuration processing. Then, the image forming apparatus 1 performs configuration processing for the apparatuses connected downstream of the image forming apparatus, i.e., downstream side network configuration processing.

When the power is turned on, the CPU 101 of the image forming apparatus 1 determines whether the upstream side network configuration has been finished or not (S1001). The upstream side network configuration processing has not been finished immediately after the power is turned on (S1001: N), so that the CPU 101 determines whether the upstream side end detection port 141 is off or not (S1002). If the upstream side input port 112 and the output port 111 are terminated, the end detection port 141 is turned on (S1002: N). In this case, since no accessory device is connected to the upstream side of the image forming apparatus 1, the upstream side network configuration is finished and the CPU 101 returns to the processing of S1001. If it is determined that the end detection port 141 is off (S1002: Y), the CPU 101 turns on the output port 111 connected to the upstream side accessory device (S1003).

If it is determined that the upstream side network configuration is finished (S1001: Y), the CPU 101 determines whether the downstream side end detection port 142 is off or not (S1004). If the downstream side input port 122 and the output port 121 are terminated, the end detection port 142 is turned on (S1004: N). In this case, since no accessory device is connected to the downstream side of the image forming apparatus 1, the downstream side network configuration is finished and the CPU 101 proceeds to the processing of S1014. If it is determined that the end detection port 142 is off (S1004: Y), the CPU 101 turns on the output port 121 connected to the downstream side accessory device (S1005).

After turning on the output port 111 or the output port 121, the CPU 101 waits for receiving a "participation notification" from the accessory device transmitted via the network bus 10 (S1006). The "participation notification" includes the node ID of the accessory device from which the participation notification is transmitted. The "participation notification" is data transmitted from the accessory device to the image forming apparatus 1 which manages the network. The accessory device transmits the "participation notification" when the accessory device requires to participate in the image forming system through the network configuration. When receiving the "participation notification" (S1006: Y), the CPU 101 determines whether the node ID(X) of the transmission source included in the "participation notification" is stored (registered) in the RAM 103 (S1007). The image forming apparatus 1 registers and manages the node ID of the accessory device participating in the image forming system in the RAM 103. If it is determined that the node ID(X) of the transmission source is registered in the RAM 103 (S1007: N), the CPU 101 discards the "participation notification" and returns to the waiting state of receiving the "participation notification" (S1006).

If it is determined that the node ID(X) of the transmission source is not registered in the RAM 103 (S1007: Y), the CPU 101 determines whether the node ID(X) is the node ID representing the sheet feeding device (S1008). Here, in addition to the node ID "2" for the sheet feeding device shown in FIG. 5, "3" and "4" are also included as the node ID representing the sheet feeding device. If it is determined that the node ID(X) is the node ID representing the sheet feeding device (S1008: Y), the CPU 101 adds (registers) the node ID(X) to the end of the upstream side device list stored in the RAM 103 (S1009). If it is determined that the node ID(X) is the node ID not representing the sheet feeding device (S1008: N), the CPU 101 adds (registers) the node ID(X) to the end of the downstream side device list stored in the RAM 103 (S1010). The upstream side device list is the list of the node ID of the accessory devices connected to the upstream side of the image forming apparatus 1. The downstream side device list is the list of the node ID of the accessory devices connected to the downstream side of the image forming apparatus 1. Using each list, the image forming apparatus 1 manages the node ID of the accessory devices forming the image forming system in the arrangement order. Since only the accessory device of the sheet feeding device is connected to the upstream side of the image forming apparatus 1, processing of S1008 to S1010 is performed.

When the node ID(X) is added to the list, the CPU 101 transmits a "response notification" to the accessory device of the transmission source of the node ID(X) via the network bus 10. The "response notification" includes information allowing participation in the system (S1011). After transmitting the "response notification", the CPU 101 determines whether a "system participation end notification" is received via the network bus 10 from the accessory device of the node ID(X) or not (S1012). The "system participation end notification" is the information transmitted from an end accessory device when, among those connected accessory devices, the end accessory device is completed to participate in the system. The end accessory device can determine whether the end accessory device itself is the end accessory device or not by the end detection port. If the "system participation end notification" is not received (S1012: N), it means that the registration of the end accessory device is not yet finished. Thereby, the CPU 101 returns to the processing of S1006 and waits for receiving the "participation notification" from a new accessory device which is unregistered. Repeating the processing of S1006 to S1012, all accessory devices of the upstream side or the downstream side are registered in the RAM 103 of the image forming apparatus 1.

If the "system participation end notification" is received (S1012: Y) the CPU 101 determines whether the upstream side and downstream side network configuration processing is respectively finished or not (S1013). In the present embodiment, the upstream side network configuration processing is first performed. Then, the downstream side network configuration processing is performed next. If the upstream side network configuration processing is only completed (S1013: N), the CPU 101 returns to the processing of S1001 and repeats the processing of S1004 to S1008 and S1010 to S1022.

When the network configuration processing at the upstream side processing and downstream side is completed (S1013: Y), the CPU 101 determines if the upstream side device list and the downstream side device list obtained this time (at S1001 and S1010) are identical to those having been backed up in the RAM 103 (S1014). It is noted that the image forming apparatus backs up the upstream side device list and the downstream side device list of the previous network configuration processing in the RAM 103. The CPU 101 compares the lists in the RAM 103 with the upstream side device list and the downstream side device list obtained this time. If it is determined that the lists in the RAM 103 and the lists obtained this time are not identical (S1014: N), the CPU 101 causes the liquid crystal display section 110 to display an image shown like FIG. 7, including information indicating that the configuration does not match and software switches of "re-recognition" and "forcibly starting", which are user-selectable (S1015).

The CPU 101 determines whether the user selected the software switch of "forcibly starting" or not (S1016). It means that the CPU 101 determines whether an instruction of "forcibly starting" is input by the operation unit 107 or not. If "re-recognition" is selected (S1016: N), the CPU 101 determines whether or not the "participation notification" including node ID(X) is received again from the accessory device which is unregistered (S1017). If the "participation notification" is not received within a predetermined time (S1017: N), the CPU 101 returns to the processing of S1015 and causes the liquid crystal to display section 110 display the image of FIG. 7 again.

If the "participation notification" is received within a predetermined time (S1017: Y), the CPU 101 determines whether or not the accessory device of the transmission source of the received node ID(X) is the sheet feeding device (S1018). If it is determined that the node ID(X) is the node ID representing the sheet feeding device (S1018: Y), the CPU 101 adds the node ID(X) to the end of the upstream side device list which is stored in the RAM 103 (S1019). If it is determined that the node ID(X) is not the node ID representing the sheet feeding device (S1018: N), the CPU 101 adds the node ID(X) to the end of the downstream side device list which is stored in the RAM 103 (S1020). It means that the CPU 101 generates the upstream side device list and the downstream side device list again through the processing from S1015 to S1020.

If the upstream side device list and the downstream side device list obtained are identical to those having been backed up in the RAM 103, or the backup is not stored (S1014: Y), the CPU 101 updates the backup (S1021). Due to this, the upstream side device list and the downstream side device list having been backed up in the RAM 103 are updated. Further, if the user selects the software switch of "forcibly starting" (S1016: Y), the CPU 101 updates the upstream side device list and the downstream side device list having been backed up (S1021). When updating the backup, the CPU 101 transmits "network configuration completion notification" to the all node ID accessory devices registered this time via the network bus 10. Then, the CPU 101 finishes the network configuration (S1022).

Through the processing as mentioned, the CPU 101 can configure network configuration of the accessory device, which is connected to the image forming apparatus 1, on the upstream side and the downstream side respectively.

(Processing of Accessory Device)

Figure 8:
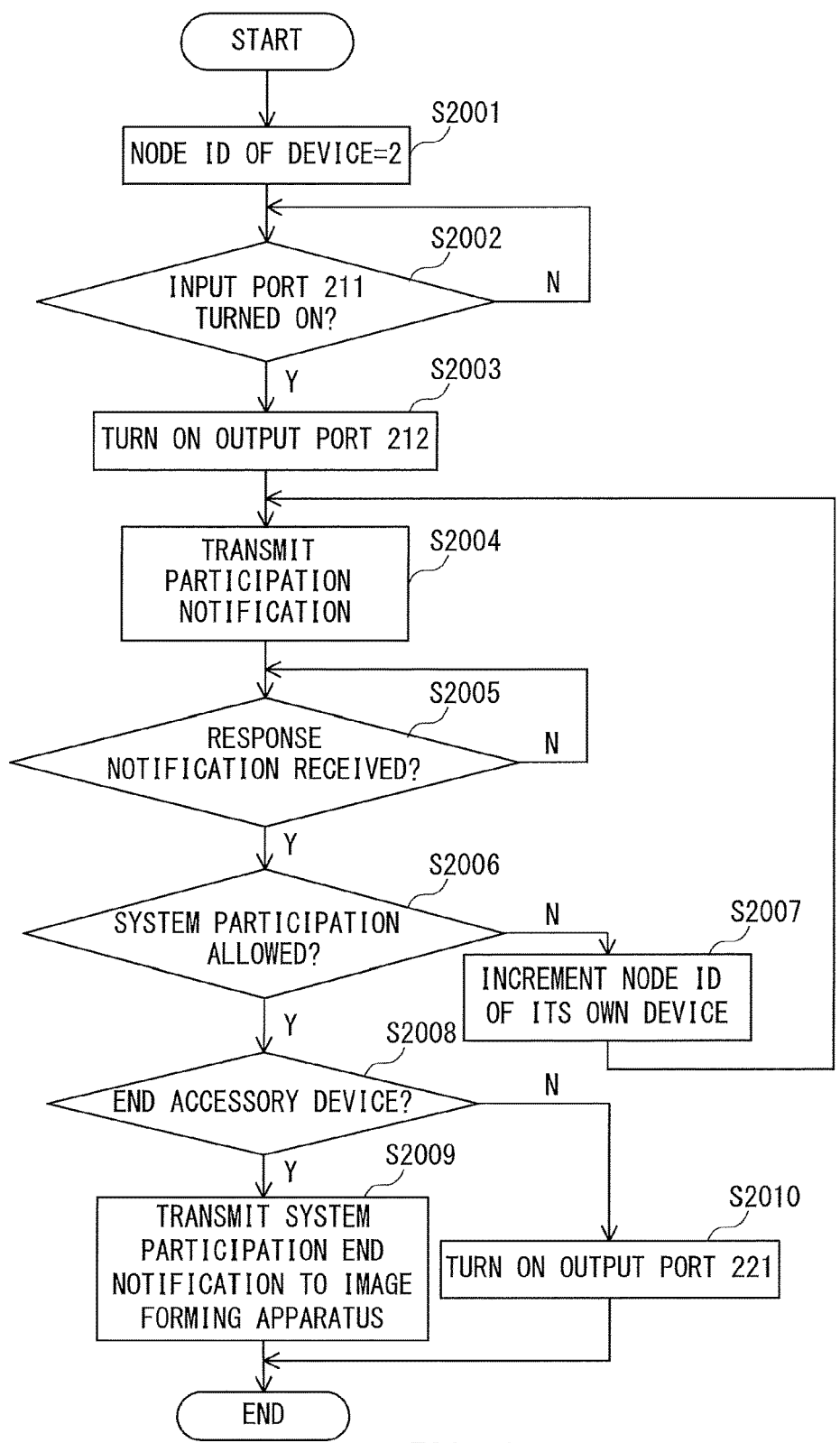
FIG. 8 is a flowchart illustrating network configuration processing by a first sheet feeding device.
Figure 9:
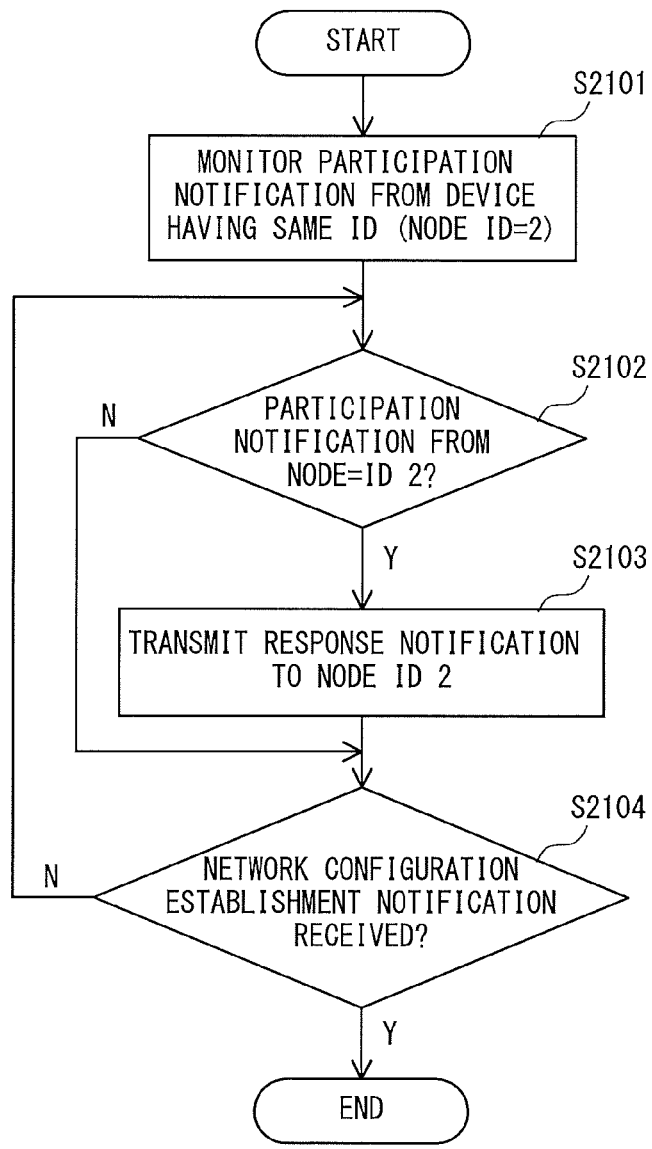
FIG. 9 is a flowchart illustrating network configuration processing by the first sheet feeding device.

FIGS. 8 and 9 are flowcharts representing the network configuration processing by the first sheet feeding device 2. FIG. 8 represents processing before participating in the image forming system. FIG. 9 represents processing after participating in the image forming system.

Before participating in the image forming system, the CPU 201 of the first feeding device 2 sets the basic node ID stored in the ROM 202 as the node ID of its own device. Then, the CPU 201 stores the set node ID in the RAM 203

(S2001). In particular, the basic node ID of the sheet feeding device is "2" (see FIG. 5), so that the node ID "2" is stored in the RAM 203.

After setting the node ID of its own device, the CPU 201 waits for the input port 211 of the input/output port 205 to be turned on (S2002). When the output port 111 of the image forming apparatus 1 is turned on at S1003 of FIG. 6, the input port 211 is turned on. If the input port 211 is turned on (S2002: Y), the CPU 201 turns on the output port 212 of the image forming apparatus 1 side (S2003).

After turning on the output port 212, the CPU 201 transmits the "participation notification" including the node ID of its own device to the image forming device 1 via the network bus 10 (S2004). The node ID is the device identification information through which the image forming apparatus 1 identifies its own device. After transmitting the "participation notification", the CPU 201 waits for receiving the "response notification" (S2005). When receiving the "participation notification" from the first sheet feeding device 2, the image forming apparatus 1 performs the processing from S1006 to S1011 in FIG. 6 as above and transmits the "response notification" to the first sheet feeding device 2.

When receiving the "response notification", the CPU 201 determines whether the contents allow participation in the system or not (S2006). If it is determined that participation in the system is not allowed (S2006: Y), the CPU 201 adds "1" to the node ID of its own device (increment) to update the node ID to be stored in the RAM 203 (S2007). Here, the node ID is updated to "3". After updating the node ID, the CPU 201 transmits the "participation notification" including the updated node ID to the image forming apparatus 1 again (S2004). The "response notification", which does not allow participation in the system, is transmitted from other accessory device (described later). Repeating the processing from S2004 to S2007 for the required number of times, the first sheet feeding device 2 transmits the node ID of its own device which is unregistered to the image forming apparatus 1.

If the "response notification" allows participation in the system (S2006: Y), the CPU 201 determines whether or not its own device is the end accessory device of the upstream side connected to the image forming apparatus 1 (S2008). By determining whether the end detection port 241 of the input/output port 205 is on or not, the CPU 201 determines whether its own device is the end accessory device or not. If it is determined to be the end accessory device (the end detection port 241 is on) (S2008: Y), the CPU 201 transmits the "system participation end notification" to the image forming apparatus 1 (S2009). If it is determined not to be the end accessory device (the end detection port 241 is off) (S2008: N), the CPU 201 turns on the output port 221 of the input/output port 205 (S2010) to allow the network configuration processing by the accessory device of the next stage.

Through the processing as above, the first sheet feeding device 2 participates in the image forming system. According to the processing of the image forming apparatus 1 in FIG. 6, the first sheet feeding device 2 is the accessory device which is first registered. Thus, participation in the system is allowed in the processing of S2006 without need to update the node ID. Thus, the node ID of the first sheet feeding device 2 remains "2". The image forming apparatus 1 registers the first sheet feeding device 2 in the network as the accessory device having the node ID of "2". In the network configuration processing as mentioned, when transmitting the first "participation notification", the basic node ID is transmitted as the device identification information.

When transmitting the second and the subsequent "participation notifications", the node ID which is updated in the processing of S2007 is transmitted as the device identification information.

The first sheet feeding device 2 monitors, after participating in the image forming system, the "participation notification" from other accessory device having the same ID as its own device (S2101). The image forming system of the present embodiment adapts a broadcast communication method. Thus, even data transmitted from other accessory device to the image forming apparatus 1, the first sheet feeding device 2 can receive the data. The CPU 201 of the first sheet feeding device 2 monitors the "participation notification" including the node ID "2" which is the same node ID "2" of its own device from data to be broadcast.

When receiving the "participation notification" including the node ID which is the same as the node ID "2" of its own device (S2102: Y), the CPU 201 transmits the "response notification", which does not allow participation in the system, to the accessory device from which the "participation notification" is transmitted (S2103). The CPU 201 monitors the "participation notification" until the CPU 201 receives a network configuration establishment notification, indicating that the network configuration is finished, from the image forming apparatus 1. When receiving the network configuration establishment notification, the CPU 201 ends the processing (S2104: Y). The processing as mentioned is performed while the processing from S1012 to S1022 in FIG. 6 is performed.

Figure 10:
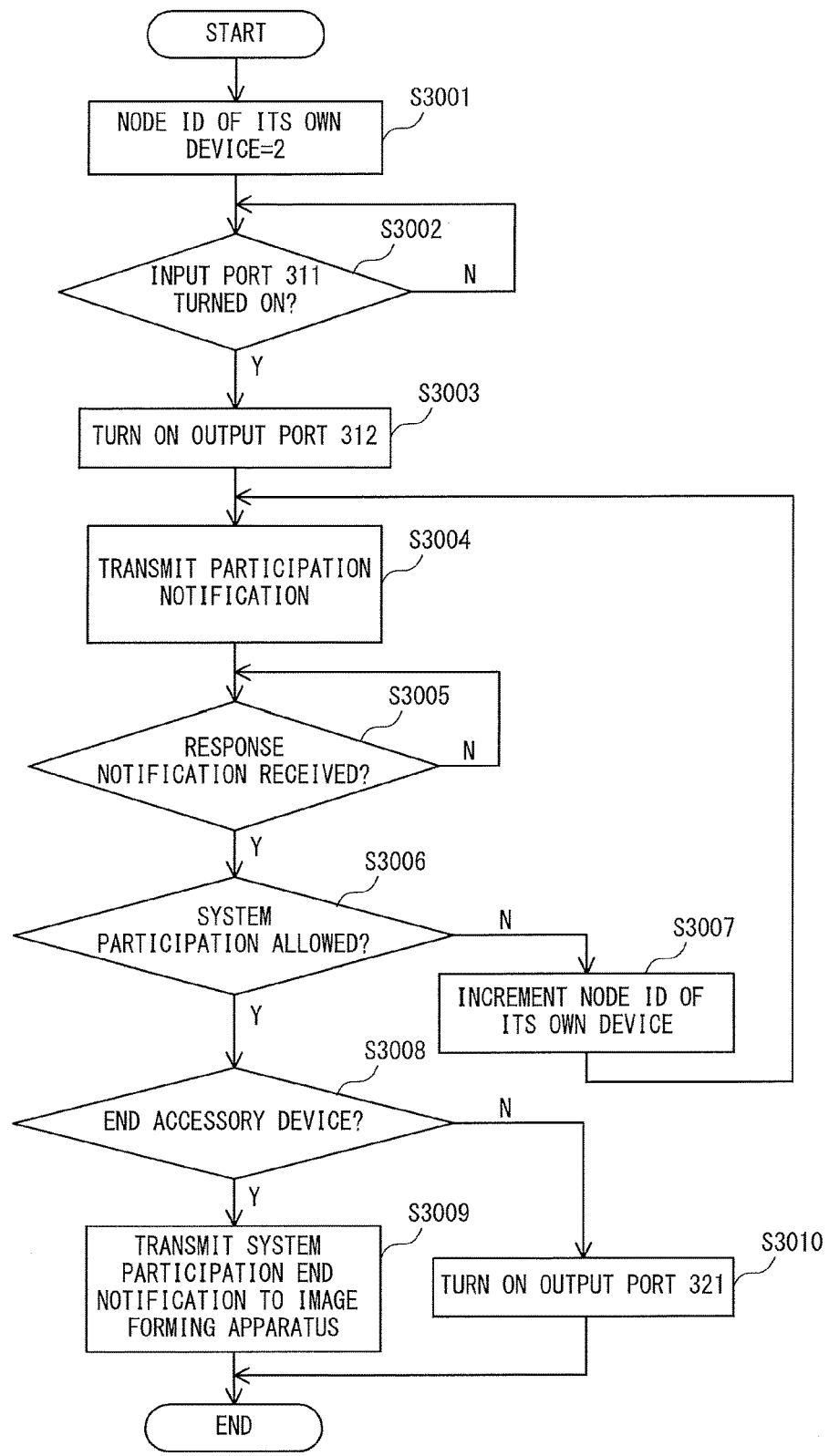
FIG. 10 is a flowchart illustrating network configuration processing by a second sheet feeding device.
Figure 11:
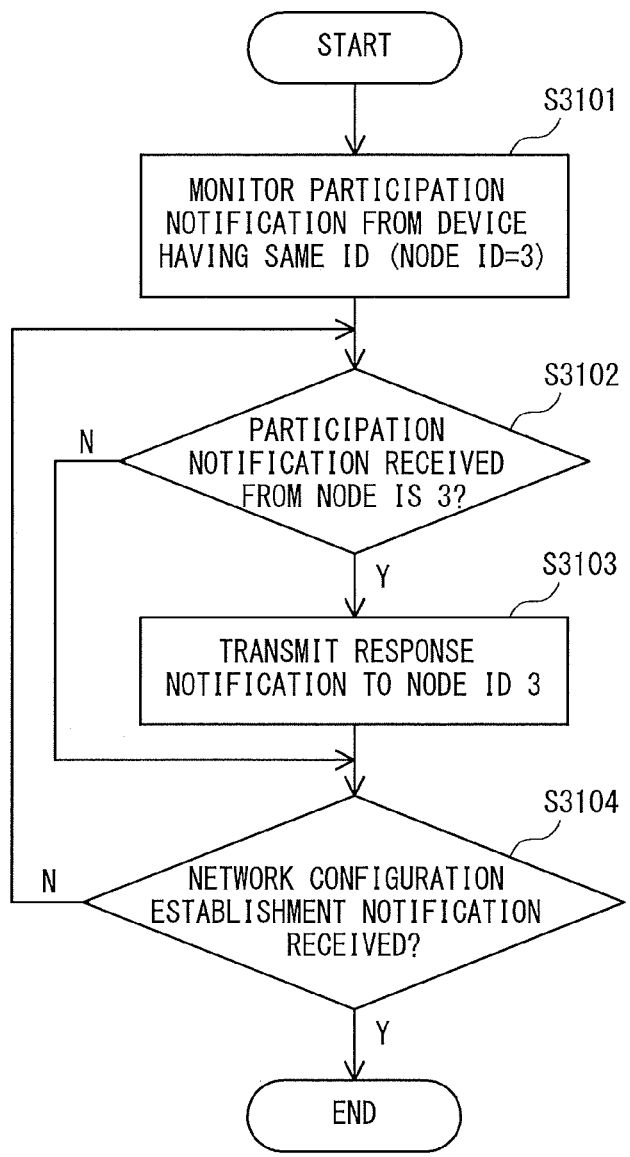
FIG. 11 is a flowchart illustrating a network configuration processing by the second sheet feeding device.

FIGS. 10 and 11 are flowcharts representing the network configuration processing by the second sheet feeding device 3. The processing contents are similar to that described with reference to FIGS. 8 and 9. Thus, the explanation thereof will be omitted. Note that after the first sheet feeding device 2 is registered in the image forming system, the second sheet feeding device 3 is registered. Thus, the processing of S3007 in FIG. 10 is performed and the node ID is updated to "3".

Figure 12:
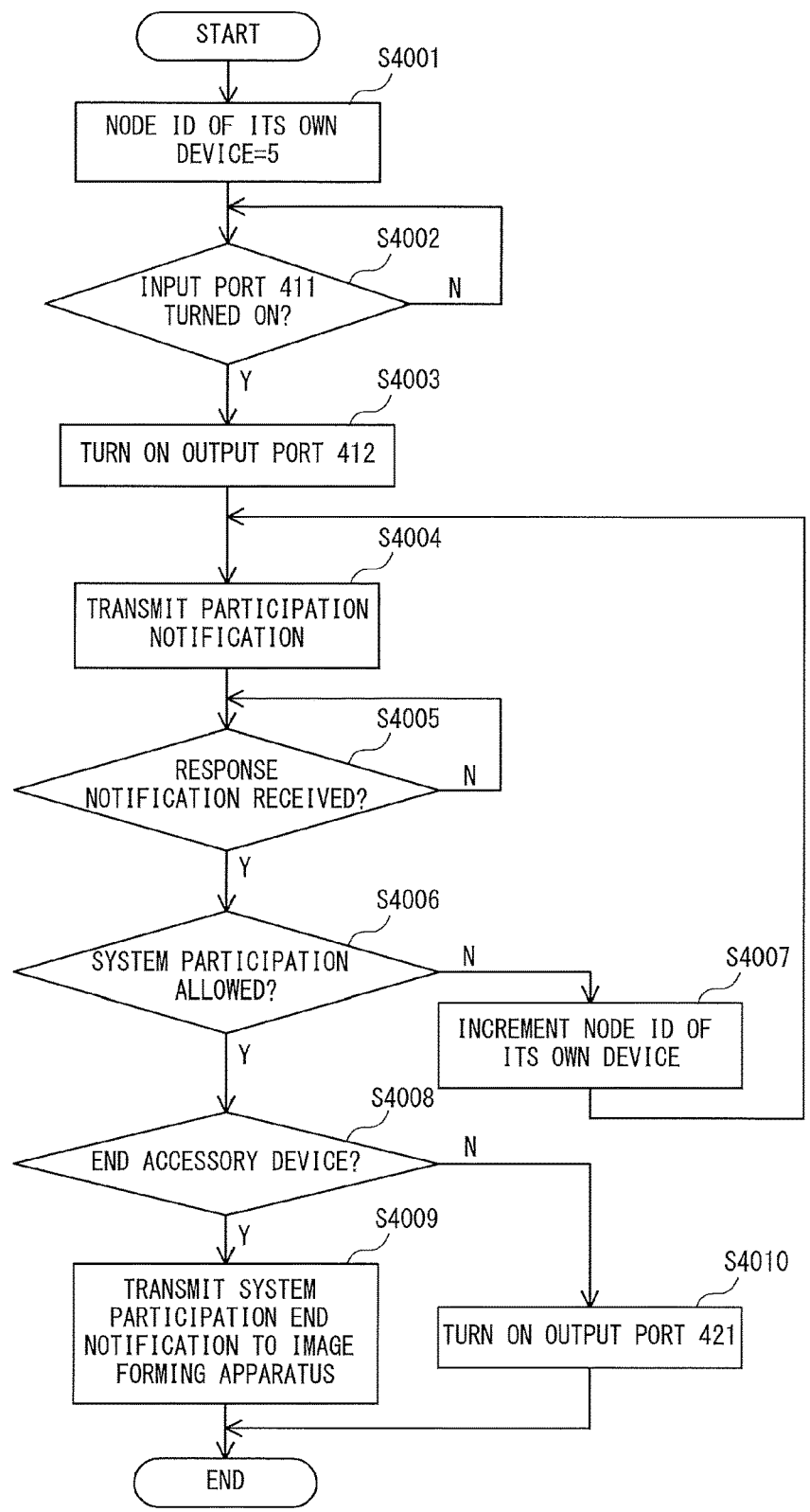
FIG. 12 is a flowchart illustrating network configuration processing by a first stacker.
Figure 13:
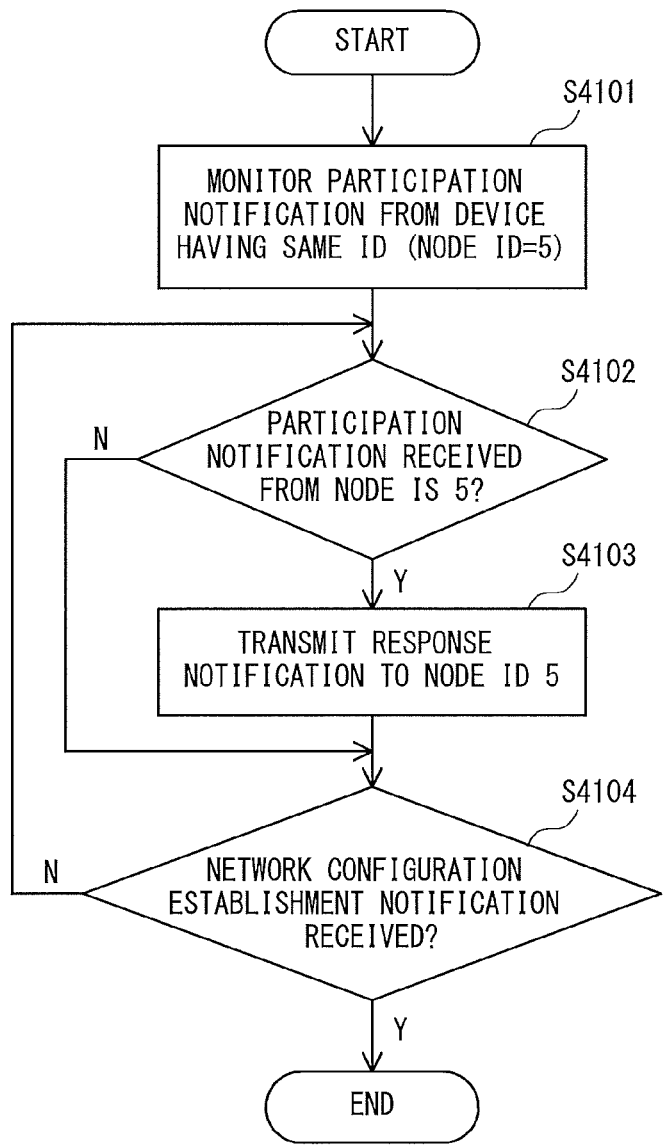
FIG. 13 is a flowchart illustrating network configuration processing by the first stacker.
Figure 14:
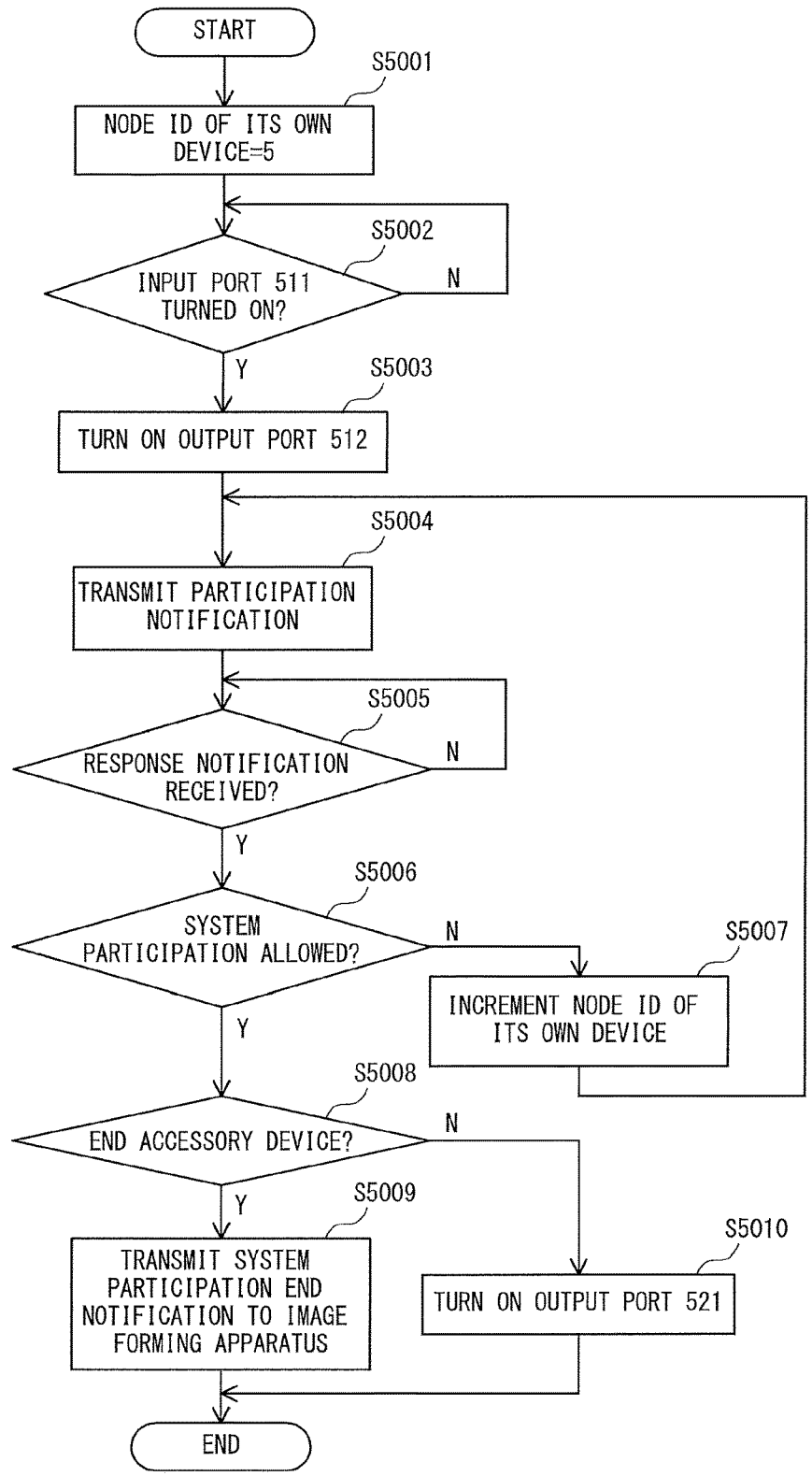
FIG. 14 is a flowchart illustrating network configuration processing by a second stacker.
Figure 15:
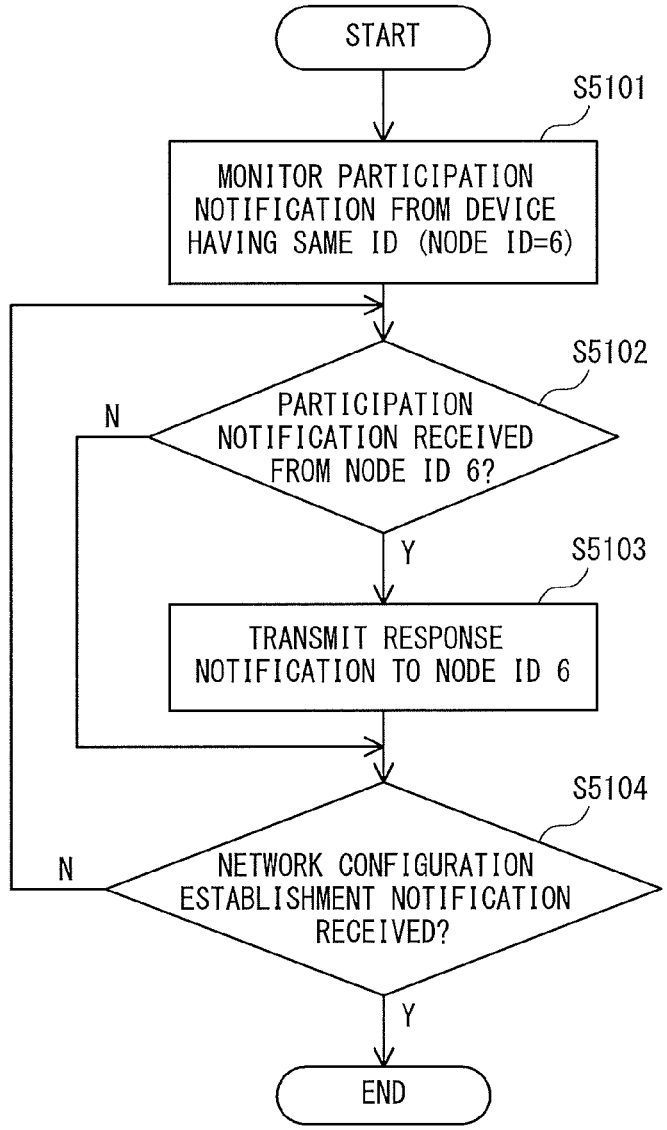
FIG. 15 is a flowchart illustrating network configuration processing by the second stacker.

FIGS. 12 and 13 are flowcharts representing the network configuration processing by the first stacker 4. The processing contents are similar to that described with reference to FIGS. 8 and 9. Thus, the explanation thereof will be omitted. The first stacker 4 is the stacker first registered. Thus, the node ID thereof is "5H". FIGS. 14 and 15 are flowcharts representing the network configuration processing by the second stacker 5. The processing contents are similar to that described with reference to FIGS. 8 and 9. Thus, the explanation thereof will be omitted. After the first stacker 4 is registered in the network, the second stacker 5 is registered. Thus, the processing of S5007 in FIG. 14 is performed and the node ID is updated to "6".

Figure 16:
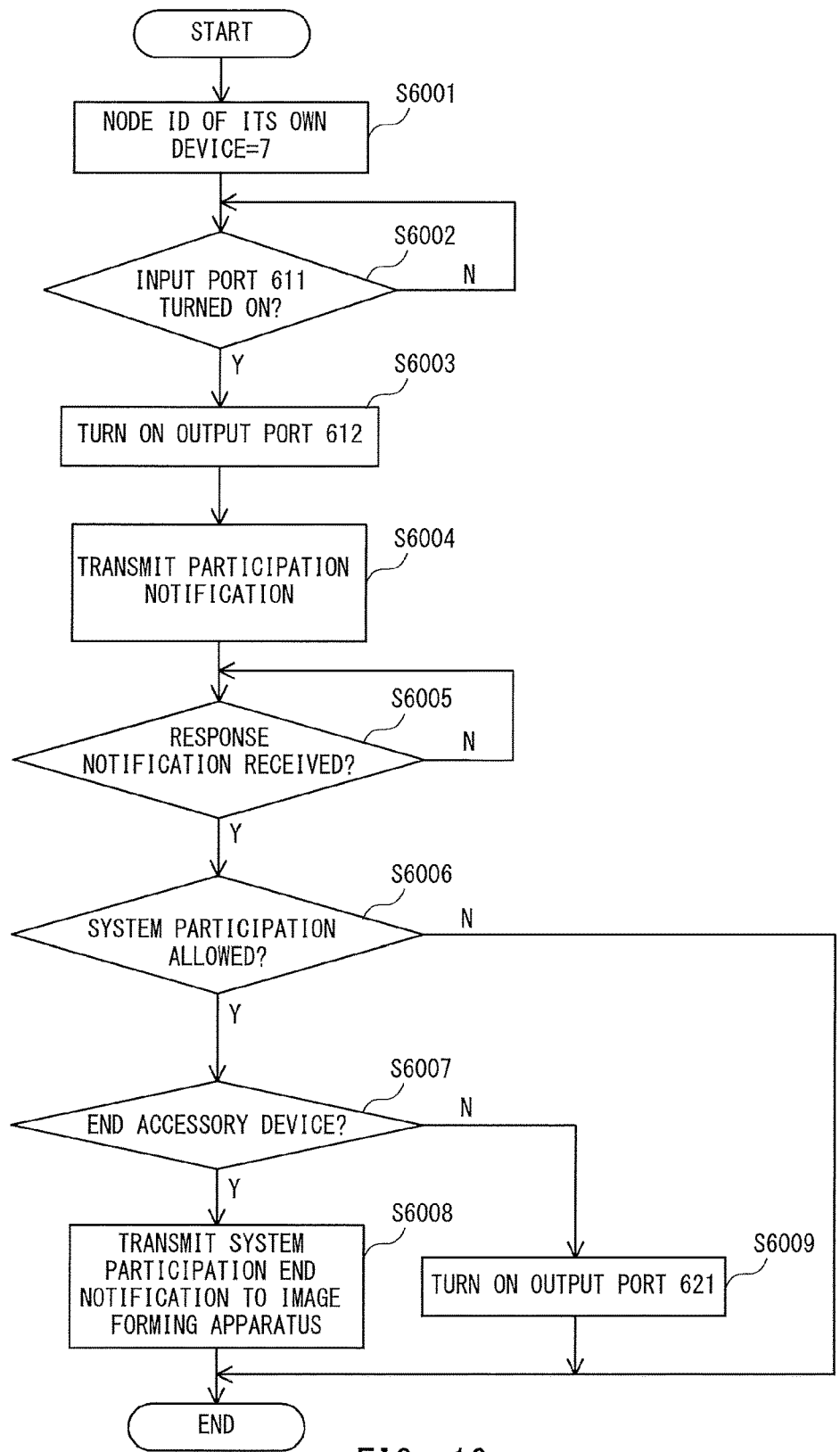
FIG. 16 is a flowchart illustrating network configuration processing by a case work device.
Figure 17:
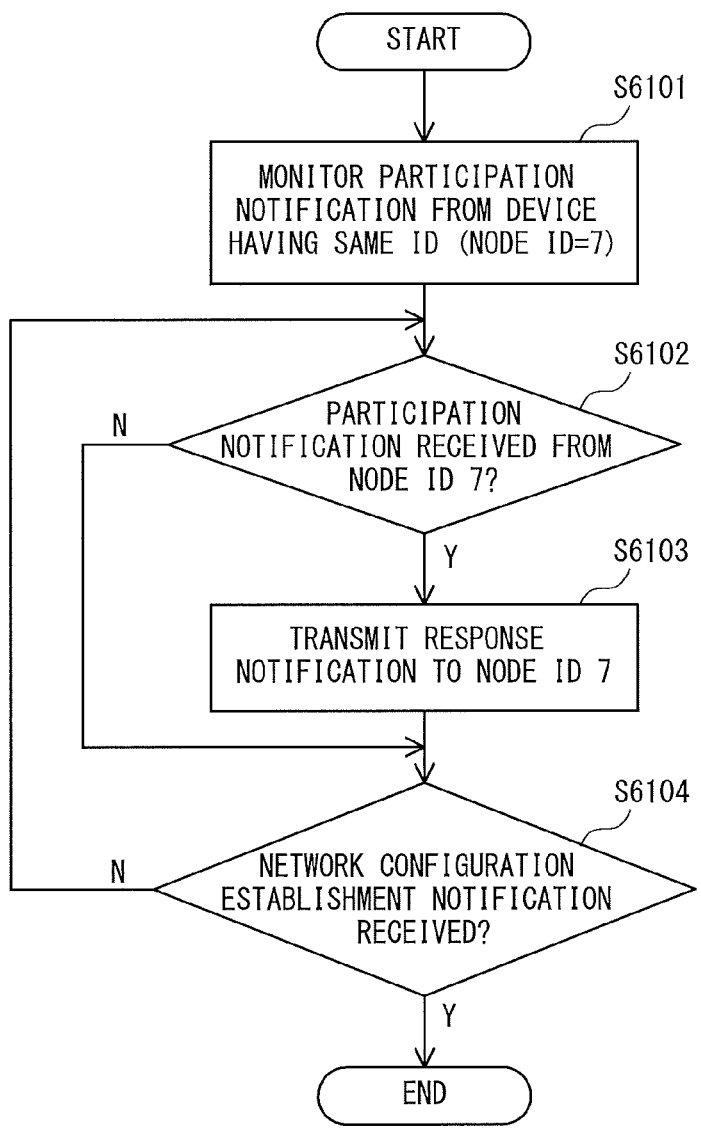
FIG. 17 is a flowchart illustrating network configuration processing by the case work device.

FIGS. 16 and 17 are flowcharts representing the network configuration processing by the case work device 6. It is not possible to connect one or more case work devices 6 so that only one case work device 6 can be provided in the image forming system. Therefore, the node ID, the basic node ID of which is "7", will not change.

Before participating in the image forming system, the CPU 601 of the case work device 6 performs processing similar to the processing from S2001 to S2006 in FIG. 8 (S6001 to S6006). If the "response notification" as received does not allow participation in the system (S6006: N), since it is not possible to connect one or more case work devices 6, the CPU 601 ends the processing. If participation in the system is allowed (S6006: Y), the CPU 601 performs processing similar to the processing from S2008 to S2010 in FIG. 8 and ends the processing (S6007 to S6009).

Processing after participating in the image forming system shown in FIG. 17 is similar to the processing in FIG. 9. Thus, the explanation will be omitted.

Figure 18:
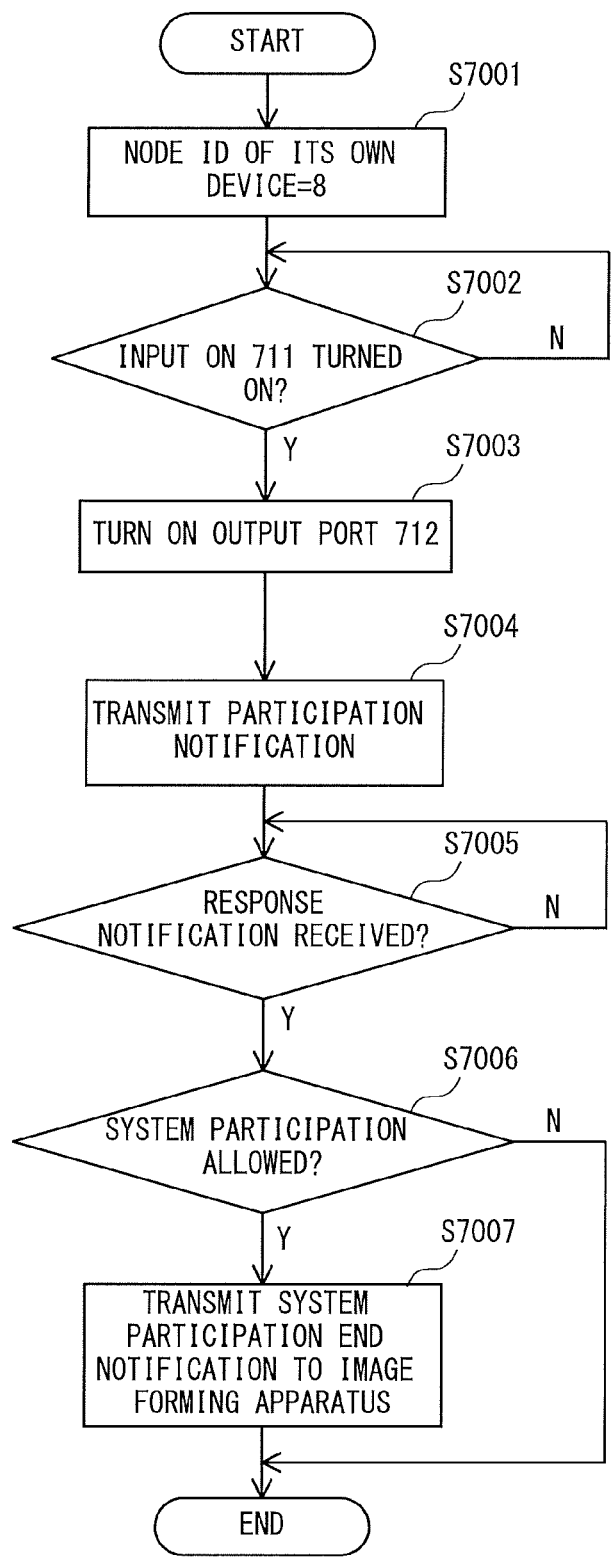
FIG. 18 is a flowchart illustrating network configuration processing by a finisher.
Figure 19:
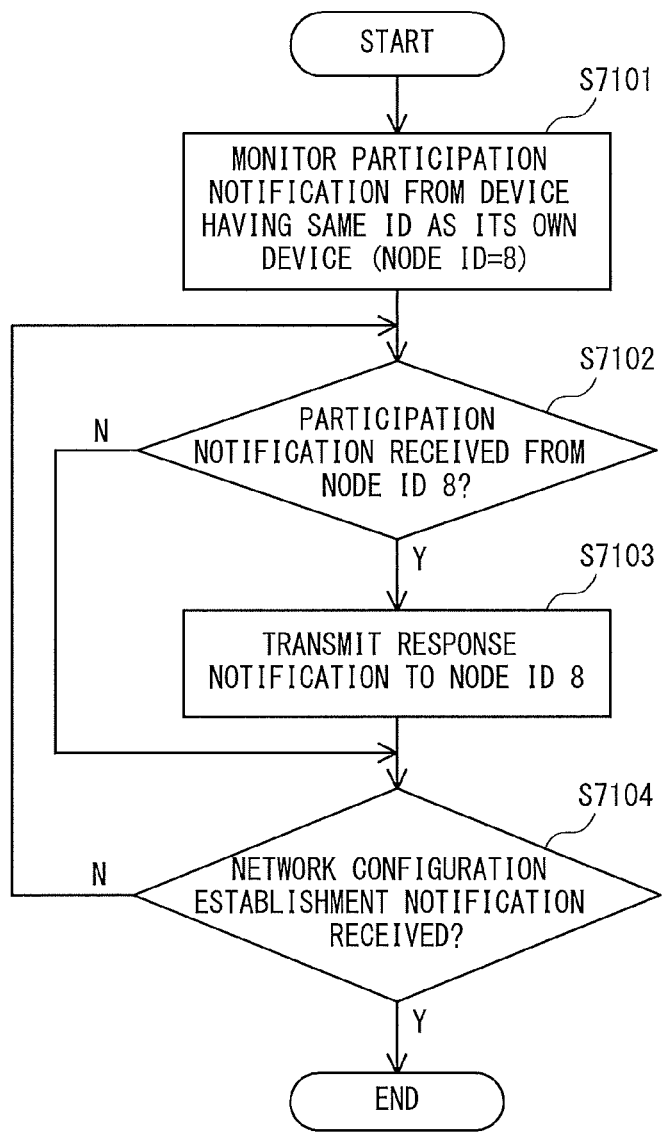
FIG. 19 is a flowchart illustrating a network configuration processing by the finisher.

FIGS. 18 and 19 are flowcharts representing the network configuration processing by the finisher 7. It is not possible to connect one or more finishers 7 so that only one finisher 7 can be provided in the image forming system. Thus, the node ID, the basic node ID of which is "8", will not change. Further, it is determined that, looking from the image forming apparatus 1 in the image forming system, the finisher 7 is provided at the end of the downstream side.

Before participating in the image forming system, the CPU 701 of the finisher 7 performs processing similar to the processing from S2001 to S2006 in FIG. 8 (S7001 to S7006). If the "response notification" as received does not allow participation in the system (S7006: N), since it is not possible to connect one or more finishers 7, the CPU 701 ends the processing. If participation in the system is allowed (S7006: Y), since its own device is determined to be the downstream side end device, the CPU 701 transmits the "system participation end notification" to the image forming apparatus 1 and ends the processing (S7007).

The processing after participating in the image forming system shown in FIG. 19 is similar to the processing in FIG. 9. Thus, the explanation will be omitted.

Due to the network configuration processing as above, the accessory devices connected to the image forming apparatus 1 are managed in such a manner that does not cause the overlap of the node ID. FIG. 20 is a diagram showing the upstream side device list and the downstream side device list of the accessory devices included in the network configured through the processing in FIGS. 6 to 19.

Using the upstream side device list and the downstream side device list, the image forming apparatus 1 stores the node ID, which is the device identification information. The node ID of the upstream side devices and the downstream side devices respectively is stored in the order close to the image forming apparatus 1. The first sheet feeding device 2 and the second sheet feeding device 3 are the same type of accessory device. Thus, conventionally, both are registered by the same node ID of "2". However, in the network configuration processing of the present embodiment, each sheet feeding device is registered by the different node ID of "2" and "3". Similarly, the first stacker 4 and the second stacker 5 are registered by the different node ID of "5" and "6". Due to this, malfunction on the network caused by the overlap of the node ID can be resolved. Further, the processing is automatically performed in the image forming system. This eliminates any need of works or settings by a service person or a user, which enables to prevent malfunction by wrong setting so that set load can be reduced.

(Second Network Configuration Processing)

Similar to the first network configuration processing, each device forming the image forming system performs the network configuration processing when powered on.

Figure 21:
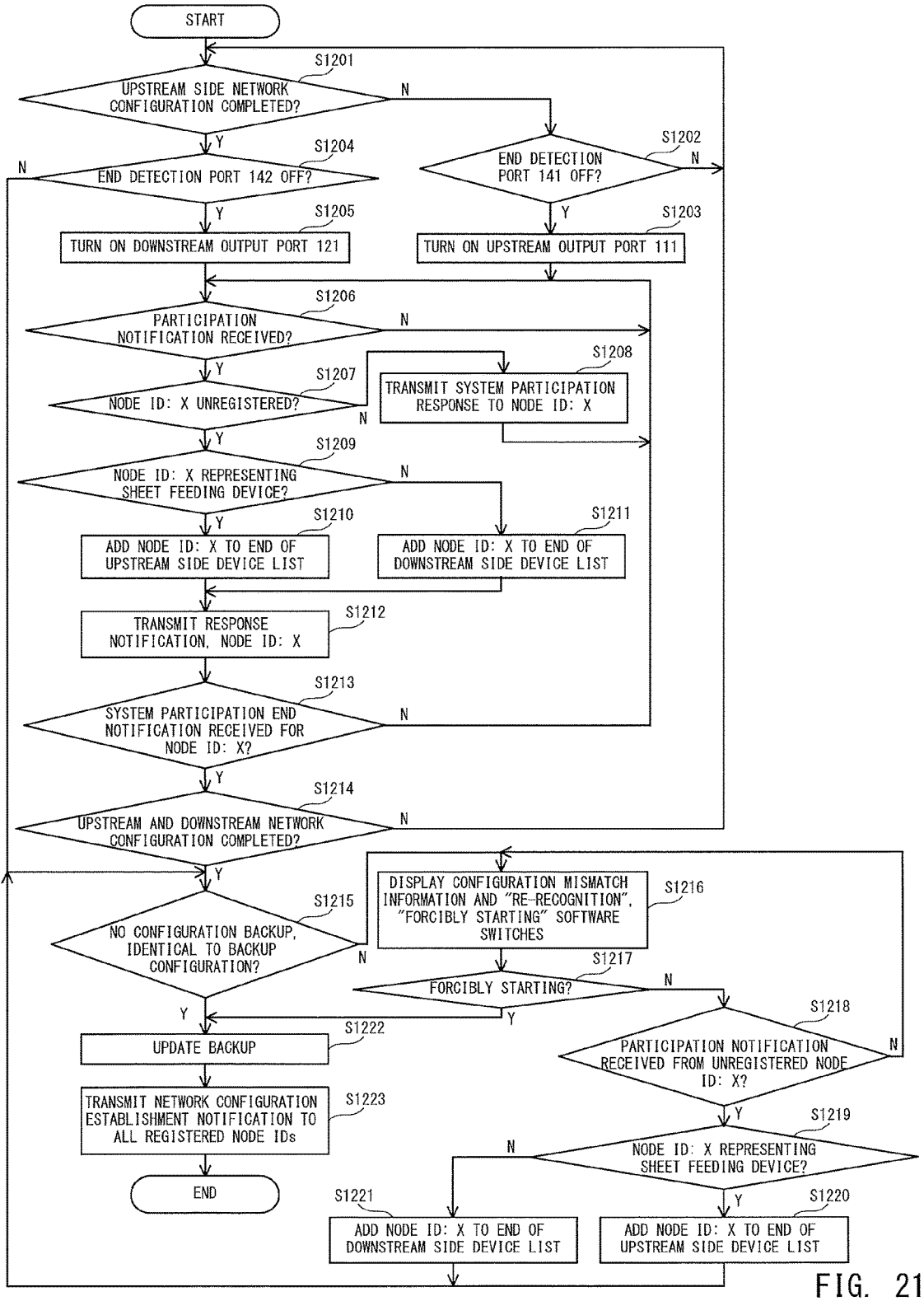
FIG. 21 is a flowchart illustrating network configuration processing by the image forming apparatus.

FIG. 21 is a flowchart illustrating the network configuration processing by the image forming apparatus 1. The image forming apparatus 1 first performs the upstream side network configuration processing. Then, the image forming apparatus 1 performs the downstream side network configuration processing next. The CPU 101 of the image forming apparatus 1 performs processing similar to the first network configuration processing (S1001 to S1006 in FIG. 6 (S1201 to S1206).

The CPU 101 confirms whether the node ID(X) included in the "participation notification" received in S1206 is already registered in the RAM 103 or not (S1207). If it is already registered (S1207: N), the CPU 101 transmits the "response notification", which does not allow participation in the system, to the accessory device from which the "participation notification" is transmitted (S1208). If it is not yet registered (S1207: Y), the CPU 10 performs processing similar to the processing from S1008 to S1022 in FIG. 6 (S1209 to S1223). The CPU 101 transmits the "network configuration completion notification" to all the registered node IDs. Then, the CPU 101 ends the network configuration processing.

In the second network configuration processing, the accessory device receives the "response notification" from the image forming apparatus 1 and never receives the notification from other accessory device. Thus, when determining whether the "response notification" allows participation in the system or not (for example, S2005, S2006 in FIG. 8), the accessory device determines by receiving the "response notification" from the image forming apparatus 1.

Figure 22:
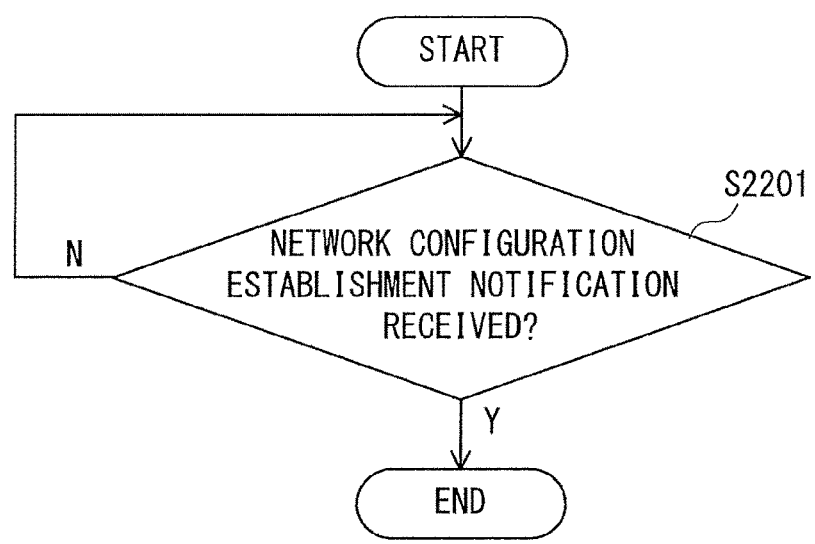
FIG. 22 is a flowchart illustrating processing after an accessory device participated in an image forming system network.

FIG. 22 is a flowchart illustrating processing after each accessory device participated in the image forming system. Processing before participating in the image forming system is similar to the first network configuration processing. Thus, the explanation will be omitted. When the processing to participate in the network is finished, the CPU of each accessory device waits for receiving the "network configuration completion notification" from the image forming apparatus 1. Then, receiving the "network configuration completion notification", the CPU ends the processing (S2201: Y). The accessory device need not monitor the "participation notification" transmitted from other accessory device.

Through the processing as above, the accessory device connected to the image forming apparatus 1 can prevent the overlap of node ID due to the "response notification" transmitted from the image forming apparatus 1. Further, as shown in FIG. 20, the image forming apparatus 1 can obtain an arrangement order of the accessory devices of upstream side and downstream side. Due to this, malfunction on the network caused by the overlap of the node ID can be resolved. Further, the processing is automatically performed in the image forming system. This eliminates any need of works or settings by a service person or a user, which enables to prevent malfunction caused by the wrong setting so that set load can be reduced.

The first network configuration processing may be combined with the second network configuration processing. It means that the "response notification", which does not allow participation in the system, may be transmitted from both the image forming apparatus 1 and the accessory device. In this case, as shown in the first network configuration processing, the accessory device monitors the "participation notification" transmitted from other accessory device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-099599, filed May 13, 2014 which is hereby incorporated by reference wherein in its entirety.

What is claimed is:

1. An image forming system having:
an image forming apparatus configured to form an image on a sheet;

a first accessory device connected to a downstream side of the image forming apparatus, configured to receive the sheet from the image forming apparatus;
a second accessory device provided at the downstream side of the first accessory device, configured to receive the sheet from the first accessory device;
a network bus to which the image forming apparatus, the first accessory device and the second accessory device are connected;
a first line configured to connect the image forming apparatus and the first accessory device; and
a second line configured to connect the first accessory device and the second accessory device,
wherein the image forming apparatus comprises:
  memory configured to store a list that indicates device identification information of the first accessory device and the second accessory device and an arrangement order of the first accessory device and the second accessory device;
  a first communication interface configured to communicate with the first and second accessory devices via the network bus;
  a first processor configured to:
    determine whether device identification information received, together with a participation notification, from the first accessory device or the second accessory device via the network bus is stored in the memory;
      when the device identification information is not stored in the list, add the device identification information to the list and send a notification which allows participation to the accessory device which corresponds to the device identification information via the network bus; and
      when the device identification information is stored in the list, discard the device identification information,
wherein the first accessory device comprises:
wherein
  an order in which device identification information is added to the list corresponds to the arrangement order;
  a second communication interface configured to communicate with the image forming apparatus via the network bus;
  a first input port to which the first line is connected;
  a first output port to which the second line is connected; and
  a second processor configured to:
    send, in accordance with a state of the first input port, the device identification information and the participation notification to the image forming apparatus via the network bus;
    change a state of the first output port from a first state to a second state, when the notification which allows participation is received from the image forming apparatus via the network bus after sending the participation notification; and
    when the notification which allows participation is not received from the image forming apparatus after sending the participation notification, change the device identification information and send the changed device identification information to the image forming apparatus via the network bus, and
wherein the second accessory device comprises:
  a third communication interface configured to communicate with the image forming apparatus via the network bus;
  a second input port to which the second line is connected; and
  a third processor configured to:
    send, in accordance with changing of the state of the first output port from the first state to the second state, the device identification information and the participation notification to the image forming apparatus via the network bus;
    and
    when the notification which allows participation is not received from the image forming apparatus after sending the participation notification, change the device identification information and send the changed device identification information to the image forming apparatus via the network bus.

2. The image forming system according to claim 1, wherein the third processor is configured to send a notification which indicates completion of participation notification from the downstream side when the second accessory device is arranged at the end.

3. The image forming system according to claim 1, wherein the second processor is further configured to:
  detect, after completing participation processing, a participation notification from another accessory device which includes the device identification identical to that of the first accessory device; and
  send, when the participation notification from the other accessory device which includes the identical device identification is detected, a notification indicating that participation is not allowed to the other accessory device.

* * * * *